US012781438B2

(12) United States Patent
Satake Neto et al.

(10) Patent No.: US 12,781,438 B2
(45) Date of Patent: Nov. 3, 2026

(54) CREPED TISSUE PRODUCTS HAVING A CROSS-MACHINE DIRECTION ORIENTED PATTERN

(71) Applicant: Kimberly-Clark Worldwide, Inc., Neenah, WI (US)

(72) Inventors: Tsutama Satake Neto, Mogi das Cruzes (BR); Patricia Câmara Mileo, Sao Paulo (BR); Jorge A. Duran, Sao Paulo (BR); Paul D. Bradford, Aylesford (GB); Peter Carson, Ulverston (GB)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 114 days.

(21) Appl. No.: 18/834,649

(22) PCT Filed: Feb. 2, 2022

(86) PCT No.: PCT/US2022/014817
§ 371 (c)(1),
(2) Date: Jul. 31, 2024

(87) PCT Pub. No.: WO2023/149868
PCT Pub. Date: Aug. 10, 2023

(65) Prior Publication Data
US 2025/0137202 A1 May 1, 2025

(51) Int. Cl.
*D21H 27/02* (2006.01)
*B31F 1/07* (2006.01)
(Continued)

(52) U.S. Cl.
CPC ............... *D21H 27/02* (2013.01); *B31F 1/07* (2013.01); *B31F 1/12* (2013.01); *D21H 25/005* (2013.01); *D21H 27/005* (2013.01)

(58) Field of Classification Search
CPC .... D21H 27/002; D21H 27/02; D21H 27/004; D21H 27/005; D21H 27/40; D21F 11/006; A47K 10/16; B31F 1/12; B31F 1/07
See application file for complete search history.

(56) References Cited

U.S. PATENT DOCUMENTS 6,547,924 B2 4/2003 Klerelid et al.
7,300,554 B2 11/2007 Lafond et al.
(Continued)

FOREIGN PATENT DOCUMENTS

CA 3064406 C * 3/2023 ........... D21H 27/002
CN 110547715 A 12/2019
(Continued)

OTHER PUBLICATIONS

Sofidel, "Sofidel Introduces Luxurious New Line of Papernet Tissue Products", Jan. 20, 2017, RISI Technology Channels, https://technology.risiinfo.com/mills/north-america/sofidel-introduces-luxurious-new-line-papernet-tissue-products.
(Continued)

*Primary Examiner* — Jose A Fortuna
(74) *Attorney, Agent, or Firm* — KIMBERLY-CLARK WORLDWIDE, INC.

(57) ABSTRACT

Tissue products, particularly creped, wet-pressed tissue products, having improved physical properties such as a high caliper and a low degree of stiffness are provided. The products are manufactured by molding the nascent tissue web to the structuring belt such that the pattern disposed on the fabric is imparted to the web and can be seen by the consumer in the finished product. Preferably the molding step occurs immediately prior to creping such that the molded, nascent, web is transferred from the structuring belt to a cylindrical dryer and then subsequently removed by creping. The structuring belt imparts the tissue web with a
(Continued)

plurality of discrete molded elements arranged to form continuous, substantially cross-machine direction (CD) oriented, line elements that not only provide the products with an aesthetically pleasing appearance but also improves certain physical properties of the finished product.

20 Claims, 9 Drawing Sheets

(51) Int. Cl.

| | |
|---|---|
| ***B31F 1/12*** | (2006.01) |
| ***D21H 25/00*** | (2006.01) |
| ***D21H 27/00*** | (2006.01) |

(56) References Cited

U.S. PATENT DOCUMENTS

| | | | | |
|---|---|---|---|---|
| 9,617,684 | B2 * | 4/2017 | Maladen | D21H 27/002 |
| 9,622,625 | B2 * | 4/2017 | Maladen | A47K 10/16 |
| 10,280,567 | B2 | 5/2019 | Vogt et al. | |
| 11,236,469 | B2 * | 2/2022 | LeCount | D21H 27/40 |
| 11,408,129 | B2 * | 8/2022 | Polat | D21H 27/02 |
| 11,542,661 | B2 * | 1/2023 | Zanon | D21H 19/68 |
| 11,732,420 | B2 * | 8/2023 | Polat | D21H 27/02 162/109 |
| 11,987,934 | B2 * | 5/2024 | Curley | D21H 27/002 |
| 12,071,729 | B2 * | 8/2024 | Polat | D21H 27/02 |
| 12,134,863 | B2 * | 11/2024 | Curley | D21H 27/40 |
| 12,173,453 | B2 * | 12/2024 | Goulet | D21H 27/007 |
| 12,281,446 | B2 * | 4/2025 | Curley | B31F 1/07 |
| 12,421,667 | B2 * | 9/2025 | Burazin | D21H 27/005 |
| 2011/0088859 | A1 | 4/2011 | Hultcrantz et al. | |
| 2012/0244320 | A1 | 9/2012 | Sauter et al. | |
| 2015/0176218 | A1 | 6/2015 | Maladen et al. | |
| 2016/0145808 | A1 * | 5/2016 | Weaver | D21H 25/005 162/100 |
| 2016/0230337 | A1 * | 8/2016 | Maladen | D21H 27/002 |
| 2017/0328011 | A1 | 11/2017 | Sealey et al. | |
| 2018/0112357 | A1 | 4/2018 | Wang et al. | |
| 2018/0142422 | A1 | 5/2018 | Baum et al. | |
| 2018/0298560 | A1 * | 10/2018 | Burazin | D21H 27/02 |
| 2019/0021553 | A1 | 1/2019 | Saas et al. | |
| 2020/0011014 | A1 | 1/2020 | Pleyber et al. | |
| 2020/0181848 | A1 * | 6/2020 | Polat | D21H 27/02 |
| 2021/0140109 | A1 * | 5/2021 | Zanon | D21H 27/002 |
| 2021/0140119 | A1 * | 5/2021 | Vogt | A47K 10/16 |
| 2025/0019904 | A1 * | 1/2025 | Curley | D21H 27/02 |
| 2025/0101684 | A1 * | 3/2025 | Bradford | D21H 27/004 |
| 2025/0137202 | A1 * | 5/2025 | Satake Neto | D21H 27/02 |
| 2025/0188683 | A1 * | 6/2025 | Satori | D21H 27/005 |

FOREIGN PATENT DOCUMENTS

| | | | | | |
|---|---|---|---|---|---|
| EP | 4125519 | B1 * | 7/2025 | D21H 27/40 |
| WO | 2019221661 | A1 | 11/2019 | |
| WO | WO-2021092282 | A1 * | 5/2021 | D21H 27/02 |
| WO | WO-2023149868 | A1 * | 8/2023 | D21F 11/006 |

OTHER PUBLICATIONS

Metso, "Tissue with High Bulk and Softness", Feb. 4, 2020, http://www.kawanoe.co.jp/pdf/Advantage_NTT.pdf.

* cited by examiner

CREPED TISSUE PRODUCTS HAVING A CROSS-MACHINE DIRECTION ORIENTED PATTERN

BACKGROUND

Methods of making tissue products are well known, including through-air drying (TAD), fabric creping, dry creping, wet creping, and so forth. Conventional wet pressing (CWP) processes have certain advantages over conventional through-air drying (TAD) processes including lower energy costs associated with the mechanical removal of water rather than transpiration drying with hot air, and higher production speeds that are more readily achieved with processes that utilize wet pressing to form a web. On the other hand, through-air drying processes have become the method of choice for new capital investment, particularly, for the production of soft, bulky, premium quality towel products.

In connection with tissue manufacturing employing through-air drying, both creped (CTAD) and uncreped (UCTAD), fabric molding has also been employed as a means to provide texture and bulk. For example, U.S. Pat. No. 10,745,864 to Wang et al. discloses three-dimensionally patterned CTAD tissue products. Products have both discrete and non-discrete elements, which are generally oriented in the machine-direction. The discrete elements are referred to as pillow regions and the continuous elements take the form of wave-shaped lines. Both the discrete and non-discrete elements have similar densities and are formed when the nascent tissue web is brought into contact with a patterned molding member, such as a three-dimensional through-air drying fabric having deflection conduits. The deflection conduits, which are arranged in a pattern of discrete dots and continuous line elements, cause the fibers of the nascent web to become rearranged and cause an apparent increase in surface area. After the fibers are rearranged, the web is non-compressively pre-dried using a through-air drier and then transported by the patterned molding member to a Yankee dryer to be finally dried. While supported by the patterned molding member, the now molded web, which may have a consistency from about 60 to about 70 percent, is adhered to the dryer by pressing. The web passes over the Yankee dryer and is removed by creping to yield a three-dimensionally patterned tissue web having discrete pillows and continuous, wave-like, line elements.

The UCTAD process may also be employed to form three-dimensionally patterned tissue webs. For example, U.S. Pat. No. 10,947,674 to Burazin et al. discloses three-dimensionally patterned UCTAD tissue products. To form the products, the nascent web is brought into contact with a through-air drying fabric having continuous, wave-like, design elements that extend substantially in the machine-direction of the fabric. The nascent web is molded into the through-air dried fabric, taking on its shape as it is non-compressively dewatered. Because the nascent, molded, web is not pressed against a Yankee drier to finally dry the web, the three-dimensionally patterned tissue web, unlike CTAD products, has a relatively uniform density. Despite having a uniform density, the pattern imparted by the through-air drying fabric is maintained because the web is dried while in contact with the fabric.

While through-air-dried products may be used to produce tissue products having three-dimensional surface patterns and improved product properties such as enhanced bulk and softness, thermal dewatering with hot air tends to be energy intensive and requires a relatively uniformly permeable substrate. Thus, wet-press operations wherein the webs are mechanically dewatered are preferable from an energy perspective and are more readily applied to furnishes containing recycled fiber, which tends to form webs with less uniform permeability than virgin fiber. Also, in conventional wet-press operations the Yankee dryer can be more effectively employed because a web is transferred thereto at consistencies of 30 percent or so, which enables the web to be firmly adhered for drying. This, however, makes it difficult to produce tissue products having three-dimensional surface patterns because at such low consistencies there is insufficient hydrogen bonding amongst the tissue product fibers to fix and retain a molded pattern. Thus, there remains a need in the art for tissue products produced using energy efficient processes, such as conventional wet pressing, that also have three-dimensional surface patterns.

SUMMARY

The present invention provides creped tissue products, particularly multi-ply rolled bath tissue products, having a three-dimensional pattern disposed thereon, the pattern being imparted by a patterned structuring fabric during the manufacturing process. Generally, the products are produced using a patterned structuring belt that supports the nascent web in the press section of a tissue machine. The use of a patterned structuring belt, particularly one having a plurality of depressions arranged to form a cross-machine direction oriented line elements, produces a tissue product having improved caliper, improved sheet bulk, lower stiffness and improved handfeel.

Accordingly, in one embodiment, the present invention provides a creped, wet pressed tissue product having a first and a second surface, the first surface comprising a plurality of discrete molded elements arranged to form continuous line elements oriented in the cross-machine direction, the product having a basis weight from about 30 to about 60 gsm, a sheet bulk of about 8.0 cc/g or greater and a Stiffness Index of about 15.0 or less. In particularly preferred embodiments, the foregoing creped, wet pressed tissue product is two-ply rolled bath tissue product and the continuous line elements are in the form of a sinusoidal wave.

In other embodiments the present invention provides a creped, wet pressed tissue product having a first and a second surface, the first surface comprising a plurality of discrete molded elements arranged to form a plurality of continuous line elements having a sinusoidal wave shape, the continuous line elements parallel to one another, equally spaced apart from one another in the machine direction (MD) and oriented substantially in the cross-machine direction (CD), the product having a basis weight from about 30 to about 60 grams per square meter (gsm), a sheet bulk of about 8.0 cc/g or greater and a Stiffness Index of about 15.0 or less.

In still other embodiments the present invention provides a fabric or belt for a papermaking machine comprising a first layer that defines a web contacting surface, the first layer comprising a plurality of discrete depressions disposed to form a line element that is aligned substantially in the cross-machine direction; and a second layer made of woven fabric that supports the first layer, wherein the first layer is bonded to the second layer.

In one exemplary embodiment, the line elements are angled from about 2 to about 10 degrees relative to the cross-machine direction. In other embodiments the fabrics and belts have a contact area of at least about 90 percent.

In certain embodiments, the fabric or belt comprises a plurality of depressions having a circular cross-sectional shape and a diameter from about 1.0 to about 2.0 mm. In other embodiments the depressions have an elliptical cross-sectional shape, the longest dimension of which is from about 1.0 to about 2.0 mm. Regardless of the shape of the depression, it is generally preferred that the depressions have a depth less than about 0.5 mm, more preferably about 0.4 mm or less, such as from about 0.2 to about 0.5 mm, such as from about 0.25 to about 0.40 mm.

The structuring belts described herein are particularly useful for producing the inventive tissue products by a tissue manufacturing process that involves pressing and creping of the tissue web during manufacture, such as Valmet's New Tissue Technology (NTT), Advantage Quality Rush Transfer ("QRT") processes and Energy Efficient Technologically Advanced Drying (ETAD), and Voith's Advanced Tissue Molding System (ATMOS) process. Generally, the tissue products are manufactured by pressing the nascent web while supported by a patterned structuring belt such that the belt pattern is imparted to the tissue web and visible in the finished product.

In yet other embodiments the present invention provides a method of forming a tissue product comprising depositing a dilute fiber furnish onto a forming fabric of a papermaking machine so as to form a wet tissue web, at least partially dewatering the wet tissue web in a press section of the papermaking machine while supported by a structuring belt comprising a plurality of discrete depressions disposed thereon, the depressions arranged to form line elements that are aligned substantially in the cross-machine direction, pressing the partially dewatered tissue web onto a cylindrical dyer to dry the tissue web and creping the dried tissue web from the surface of the cylindrical dryer.

DEFINITIONS

Figure 1:
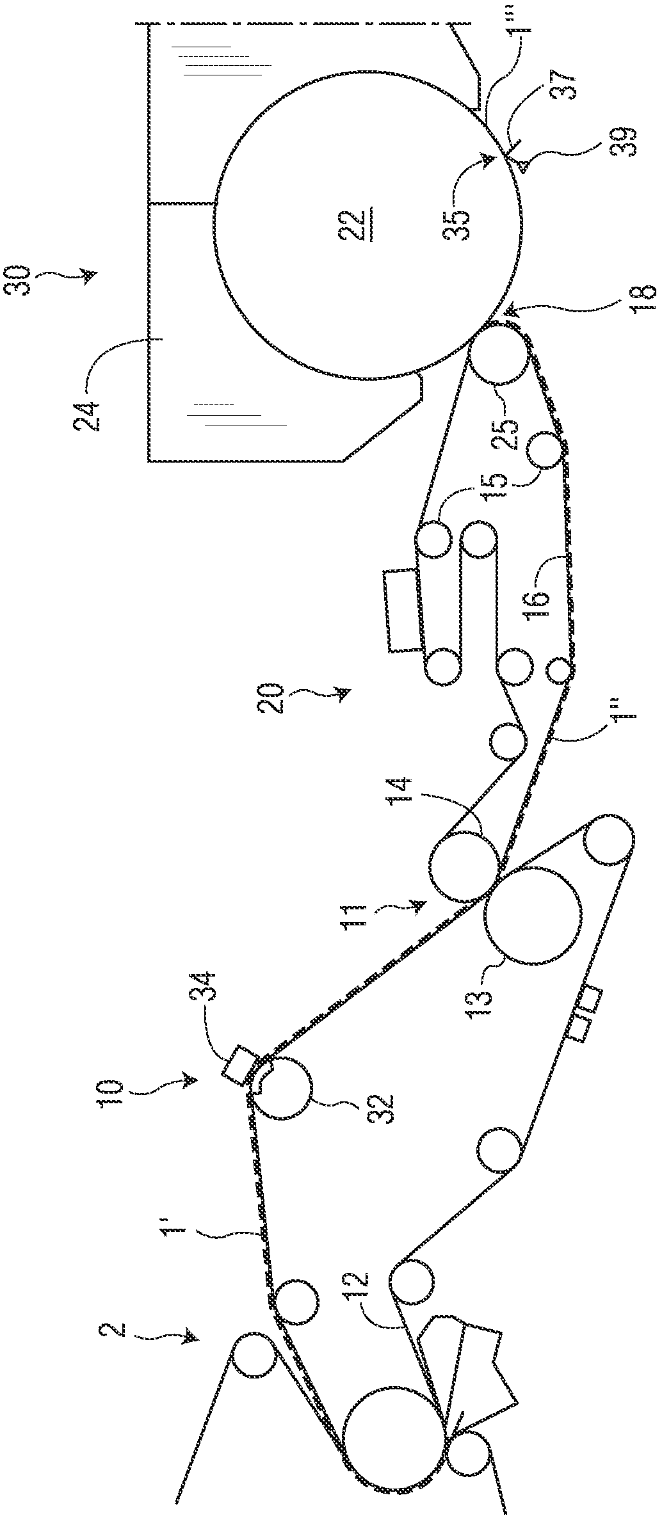
FIG. 1 is a schematic of one tissue manufacturing process useful in producing the tissue products of the present invention.

As used herein, the term "machine direction" (MD) generally refers to the direction parallel to the path of travel of the fabric during the manufacturing process.

As used herein, the term "cross-machine direction" (CD) generally refers to a direction perpendicular to the machine direction.

As used herein, the term "z-direction" generally refers to a direction orthogonal to the machine and cross-machine direction.

As used herein, the term "tissue product" refers to products made from tissue webs and includes, bath tissues, facial tissues, paper towels, industrial wipers, foodservice wipers, napkins, medical pads, and other similar products. Tissue products may comprise one, two, three or more plies.

As used herein, the terms "tissue web" and "tissue sheet" refer to a fibrous sheet material suitable for forming a tissue product.

As used herein, the term "depression" generally refers that portion a papermaking fabric that lies below the upper most surface plane of the fabric. Generally papermaking fabrics useful in the present invention comprise a plurality of depressions disposed on the web contacting surface of the fabric for contacting and interacting with the nascent tissue web. The plurality of depressions may be the same or different dimensions and may be arranged to form a pattern.

As used herein, the term "molded element" refers to an element disposed on the surface of a tissue web or product that is formed during the tissue manufacturing process prior to final drying of the tissue web. Generally molded elements are formed according to the present invention by pressing the nascent, partially dewatered, tissue web through a nip formed by a structuring belt and a dewatering felt and then further molding the nascent web into depressions on the structuring belt as it passes through the creping nip. Molded elements are distinct from elements formed by embossing, which typically are formed after the web has been finally dried.

As used herein the term "line element" refers to an element in the shape of a line, which may be a continuous, discrete, interrupted, and/or partial line with respect to a support structure on which it is present. The line element may be of any suitable shape such as straight, bent, kinked, curled, curvilinear, serpentine, sinusoidal, and mixtures thereof. In one example, the line element may comprise a plurality of discrete elements, such as dots, dashes, or broken lines for example, that are oriented relative to one another to form a line element having a substantially connected visual appearance.

As used herein the term "continuous line element" refers to a line element disposed on a support structure that extends without interruption throughout one dimension of the support structure.

As used herein the terms "discrete" when referring to depressions, or elements formed thereby, generally means the depressions or elements are separate and unconnected from one another. In one example, a plurality of discrete depressions having a circular or oval shape may be arranged so as to form a line element, which may be used to form a pattern.

As used herein the term "pattern" generally refers to the arrangement of one or more design elements. Within a given pattern the design elements may be the same or may be different, further the design elements may be the same relative size or may be different sizes. For example, in one embodiment, a single design element may be repeated in a pattern, but the size of the design element may be different from one design element to the next within the pattern.

As used herein, the term "support structure" generally refers to a layer of the multi-layered structuring belt of the present invention, the bottom surface of which is brought into contact with papermaking machinery during use. In particularly preferred embodiments the support structure is a woven fabric onto which one or more nonwoven layers are laminated to from the multi-layered structuring belt.

As used herein, the term "woven" generally refers to a structure formed from a plurality of interconnected filaments. Woven refers to structures comprising a plurality of filaments that have been interconnected by weaving two or more filament together, such as by interlacing in a repeating pattern, as well as structures made of a multiplicity of helical coils or links of filaments such as wire-link fabrics disclosed, for example, in U.S. Pat. No. 5,334,440.

As used herein, the term "layer," when referring to fabrics useful in the manufacture of tissue products according to the present invention, such as a structuring belt, means a continuous, distinct part of the fabric structure that is physically separated from another continuous, distinct layer in the fabric structure.

As used herein the term "basis weight" generally refers to the conditioned weight per unit area of a tissue and is generally expressed as grams per square meter (gsm). Basis weight is measured as described in the Test Methods section below. While the basis weights of tissue products prepared according to the present invention may vary, in certain embodiments the products have a per ply basis weight (product basis weight divided by the total number of product plies) from about 10 to about 45 gsm, such as from about 12 to about 42 gsm, such as from about 14 to about 40 gsm. The tissue products may have a basis weight greater than about 20 gsm, such as greater than about 30 gsm, such as greater than about 40 gsm, such as from about 20 to about 80 gsm, such as from about 30 to about 60 gsm, such as from about 45 to about 55 gsm.

As used herein, the term "caliper" refers to the thickness of a tissue product, web, sheet, or ply, typically having units of microns (μm) and is measured as described in the Test Methods section below. Two-ply rolled bath tissue products prepared according to the present invention may have a caliper of at least about 300 microns, more preferably at least about 350 microns and more preferably at least about 400 microns.

As used herein, the term "sheet bulk" refers to the quotient of the caliper (μm) divided by the bone dry basis weight (gsm). The resulting sheet bulk is expressed in cubic centimeters per gram (cc/g). Tissue products prepared according to the present invention may, in certain embodiments, have a sheet bulk greater than about 8.0 cc/g, more preferably greater than about 9.0 cc/g, and still more preferably greater than about 10.0 cc/g, such as from about 8.0 to about 12.0 cc/g.

As used herein, the term "slope" refers to the slope of the line resulting from plotting tensile versus stretch and is an output of the MTS TestWorks™ in the course of determining the tensile strength as described in the Test Methods section herein. Slope is reported in the units of grams (g) per unit of sample width (inches) and is measured as the gradient of the least-squares line fitted to the load-corrected strain points falling between a specimen-generated force of 70 to 157 grams (0.687 to 1.540 N) divided by the specimen width.

As used herein, the term "geometric mean slope" (GM Slope) generally refers to the square root of the product of machine direction slope and cross-machine direction slope. While the GM Slope may vary amongst tissue products prepared according to the present disclosure, in certain embodiments, tissue products may have a GM Slope less than about 18.00 kg, more preferably less than about 16.00 kg and still more preferably less than about 14.00 kg, such as from about 12.0 to about 18.0 kg.

As used herein, the term "geometric mean tensile" (GMT) refers to the square root of the product of the machine direction tensile strength and the cross-machine direction tensile strength of the web. The GMT of tissue products prepared according to the present invention may vary, however, in certain instances the GMT may be about 700 g/3" or greater, such as about 800 g/3" or greater, such as about 900 g/3" or greater, such as from about 700 about 1,700 g/3", such as from about 800 to about 1,600 g/3", such as from about 900 to about 1,500 g/3".

As used herein, the term "Stiffness Index" refers to the quotient of the geometric mean tensile slope, defined as the square root of the product of the MD and CD slopes (having units of kg), divided by the geometric mean tensile strength (having units of grams per three inches).

$$\text{Stiffness Index} = \frac{\sqrt{MD\text{ Tensile Slope (kg)} \times CD\text{ Tensile Slope (kg)}}}{GMT(\text{g}/3'')} \times 1{,}000$$

While the Stiffness Index of tissue products prepared according to the present disclosure may vary, in certain instances the Stiffness Index may be about 15.0 or less, such as about 12.0 or less, such as about 10.0 or less, such as from about 6.0 to about 15.0, such as from about 6.0 to about 12.0.

As used herein, the term "TS7" generally refers to the softness of a tissue product surface measured using an EMTEC Tissue Softness Analyzer ("EMTEC TSA") (EMTEC Electronic GmbH, Leipzig, Germany) interfaced with a computer running EMTEC TSA software (version 3.19 or equivalent). The units of the TS7 are dB V2 rms, however, TS7 values are often referred to herein without reference to units. Generally, the TS7 is the magnitude of the peak occurring at a frequency between 6 and 7 kHz which is produced by vibration of the tissue product during the test procedure. Generally, a peak in this frequency range having a lower amplitude, and hence a lower TS7 value, is indicative of a softer tissue product. In certain instances, two-ply rolled bath tissue products prepared according to the present invention may have a TS7 value of about 13.0 or less, more preferably 12.0 or less, such as from about 10.0 to about 13.0.

DESCRIPTION

Tissue products of the present invention are generally manufactured using a wet pressed tissue manufacturing process that employs a structuring belt that imparts a unique and beneficial three-dimensional pattern to the resulting tissue product. That is, the nascent tissue web is partially dewatered by pressing prior to being transferred to a structuring fabric that molds the web prior to it being pressed onto a heated cylinder and then removed from the cylinder with doctoring, also referred to as creping. The heated cylinder may be heated with steam and may be coated with one or more chemical additives known in the art to facilitate adhering the partially dewatered web as it is transferred from a press element nip to the cylinder. The one or more chemical additives may also aid in removal of the sheet at the doctor blade. The sheet may be dried to up to 99 percent solids by the heated cylinder, alone, or in combination with hot air provided by an impingement hood or other means of supplemental drying. The dried, creped, tissue web may be subjected to further converting such as calendering, slitting, winding, folding, plying, embossing, surface treatment or the like, to provide a finished tissue product to be used by a consumer.

Suitable wet pressed tissue manufacturing processes include Valmet's New Tissue Technology (NTT), Advantage Quality Rush Transfer ("QRT") processes and Energy Efficient Technologically Advanced Drying (ETAD), and Voith's Advanced Tissue Molding System (ATMOS) process. Each of the foregoing tissue manufacturing processes are commercially available and while differing in regard to installed capital cost, raw material utilization, energy utilization and production rates they are all suitable processes for producing the tissue products of the present invention. The NTT process and products are described in U.S. Pat. No. 8,414,741. The QRT process is described in U.S. Pat. No. 7,811,418. The ETAD process and products are described, for example, in U.S. Pat. Nos. 7,339,378 and 9,279,219. The ATMOS process is described in U.S. Pat. No. 7,524,403. Each of the foregoing patents are hereby incorporated by reference in a manner consistent with the present disclosure.

In certain instances, it may be preferable to manufacture tissue products of the present invention using a wet pressed tissue manufacturing process that passes the nascent, partially dewatered, tissue web through a nip formed by a structuring belt and a dewatering felt. The dewatering felt may be supported by a press roll that may be supplied with vacuum to further assist water removal. This fabric press arrangement is described in U.S. Pat. Nos. 8,382,956 and 8,580,083, both of which are incorporated herein by reference in a manner consistent with the present disclosure.

FIG. 1 shows a wet-pressed tissue manufacturing process useful in manufacturing tissue products of the present invention. The process includes a forming section 2, a press section 10, a molding section 20, and final drying section 30. The press section 10 is similar to the press section described in U.S. Patent Application Publication No. 2011/0180223. The press section 10 comprises a first press nip 11 formed between dewatering felt 12 supported by a first press roll 13 and a structuring belt 16 supported by a second press roll 14. In the illustrated embodiment, first and second press rolls 13, 14 are conventional press rolls, however, rolls forming a long nip can be used, such as shoe press rolls and other types of presses with a long nip. The dewatering felt 12 and the structuring belt 16 co-operate with each other to form a first nip 11. The structuring belt 16 generally runs in an endless loop about a plurality of guide rolls 15 and around a transfer roll 25, located adjacent to the drying section 30, which comprises a drying cylinder 22 and impingement hood 24 for final drying of the tissue web 1'.

In certain embodiments, such as the process illustrated in FIG. 1, the formed tissue web 1' may be subjected to pre-dewatering prior to entering the first nip 11. The pre-dewatering may be carried out by a suction device comprising a suction roll 32 (or similar known conventional devices with vacuum of 30-50 kPa) located inside the loop of the dewatering felt 12, and a steam box 34 located on the outside of the loop of the dewatering felt 12 opposite the suction roll 32 to heat the water in the formed web 1'. Alternatively, other dewatering devices known in the art can be used. By means of such a suction roll 32 and steam box 34, the quantity of water is reduced in the formed web 1' and in the dewatering felt 12 and the consistency of the web 1' increases to at least about 8 percent, more preferably at least about 10 percent and more preferably at least about 12 percent, such as from about 8 to about 20 percent, so that the formed web 1' obtains a desirably increased dry content before it enters the first nip 11. Note that "consistency," as used herein, refers to the percentage of solids of a nascent web, for example, calculated on a bone dry basis.

Suitable press fabrics for use in the manufacture of tissue products of the present invention are well known in the art and may comprise woven monofilaments or multi-filamentous yarns needled with fine synthetic batt fibers. Particularly preferred are press felts that are elastically deformable and compressible in the z-direction and that run in an endless loop. Preferably the felt is configured such that as the formed web 1' is press in the first nip 11 substantially all the water is carried away by the press felt, and that essentially no rewetting of the dewatered web 1" occurs between the first and second nips 11, 18 since the dewatering felt 12 and the structuring belt 16 are separated from each other immediately after the exit of the nip 11.

Generally, the formed tissue web 1' is contacted by the dewatering felt 12 and the structuring belt 16 and passed through the first press nip 11 where it may be further dewatered as it is transferred to the structuring fabric 16 and molded thereto. Preferably the formed web 1' passes through the first nip 11 and is dewatered such that the quantity of water is reduced in the formed web 1' and the dry content of web 1" increases to greater than about 40 percent, such as greater than about 45 percent, such as from about 40 to 50 percent. In this manner the dewatered web 1" achieves the desired dryness as it is transferred to the structuring belt 16 and conveyed to the drying section 30 to achieve the desired molding of the dewatered web 1" and impart a three-dimensional pattern comprising a plurality of molded elements thereupon that corresponds to a pattern of depressions on the structuring belt 16. In this manner, the nascent web is imparted with a plurality of molded elements prior to final drying of the web. These molded elements impart improved physical properties to the web and improved product appearance, as will be described in more detail herein.

In particularly preferred embodiments the partially dewatered web 1" is transferred to the structuring belt 16 and immediately leaves the first nip 11 to avoid rewetting of the web. The dewatered web 1" is carried by the structuring belt 16 up to and through a second nip, referred to as the transfer nip 18, which is formed between the structuring belt 16, as it is supported by the transfer roll 20, and the drying cylinder 22. In certain instances, it may be preferable that no pressing or dewatering of the dewatered web 1" takes place at the transfer nip 18, but only a transfer of the dewatered web 1" to the surface of the drying cylinder 22.

Transfer of the dewatered web 1" to the drying cylinder 22, which in certain preferred embodiments may be a Yankee dryer, may occur, for example, at a pressure of 60 to 90 kN/m (340 to 514 PLI). The transfer at nip 18 may occur at a web consistency, for example, from about 25 to about 70 percent. At some consistencies, it is sometimes difficult to adhere the web 1" to the surface of the drying cylinder 22 firmly enough so as to thoroughly remove the web from the structuring belt 16. In order to increase the adhesion between the web 1" to the surface of the drying cylinder 22, an adhesive may be applied to the surface of the drying cylinder 22. The adhesive can allow for high velocity operation of the system and high jet velocity impingement air drying (impingement hood 24 illustrated in FIG. 1), and also allow for subsequent peeling of the dried web 1" from the drying cylinder 22. An example of such an adhesive is a poly(vinyl alcohol)/polyamide adhesive composition. Those skilled in the art, however, will recognize the wide variety of alternative adhesives, and further, quantities of adhesives, that may be used to facilitate the transfer of the web 1''' from the drying cylinder 22.

The partially dewatered web 1''' is dried on the drying cylinder 22, which, in the illustrated embodiment, is further heated by high jet velocity impingement air in the hood 24 around the drying cylinder 22. As the drying cylinder 22 rotates, the dried web 1''' is peeled from the dryer 22 at position 35 by a creping blade 37. The dried web 1''' may then be subsequently wound on a take-up reel (not shown). The reel may be operated slower than the drying cylinder 22 at steady-state in order to impart a further crepe to the dried web 1'''. Optionally, a creping doctor blade 37 may be used to conventionally dry-crepe the dried web 1'''. In any event, a cleaning doctor 39 may be mounted for intermittent engagement and used to control buildup of material on the surface of the heated cylinder.

Transferring the formed and partly dewatered web from the press section to the drying cylinder using a structuring belt preferably imparts a three-dimension pattern to the web in the form of a plurality of molded elements and improves the finished product properties of the dried tissue web. Accordingly, after the press dewatering stage, molded elements may be imparted to the web by the structuring belt, with the resulting web being referred to as a structured web or sheet. One manner of imparting molded elements to the web involves the use of a creping operation while the web is still in a semi-solid, moldable state. Preferably the creping operation uses a structuring belt, and the creping operation occurs under pressure in a creping nip, with the web being forced into depressions on the structuring belt as it passes through the creping nip. Subsequent to the creping operation, a vacuum may also be used to further draw the web into the depressions on the structuring belt. After the nascent web is molded to the structuring belt, the web is dried to substantially remove any desired remaining water and leaving the dried web with a lasting three-dimensional pattern, preferably a pattern of molded elements, that reflects the pattern of depressions on the structuring belt.

Figure 2:
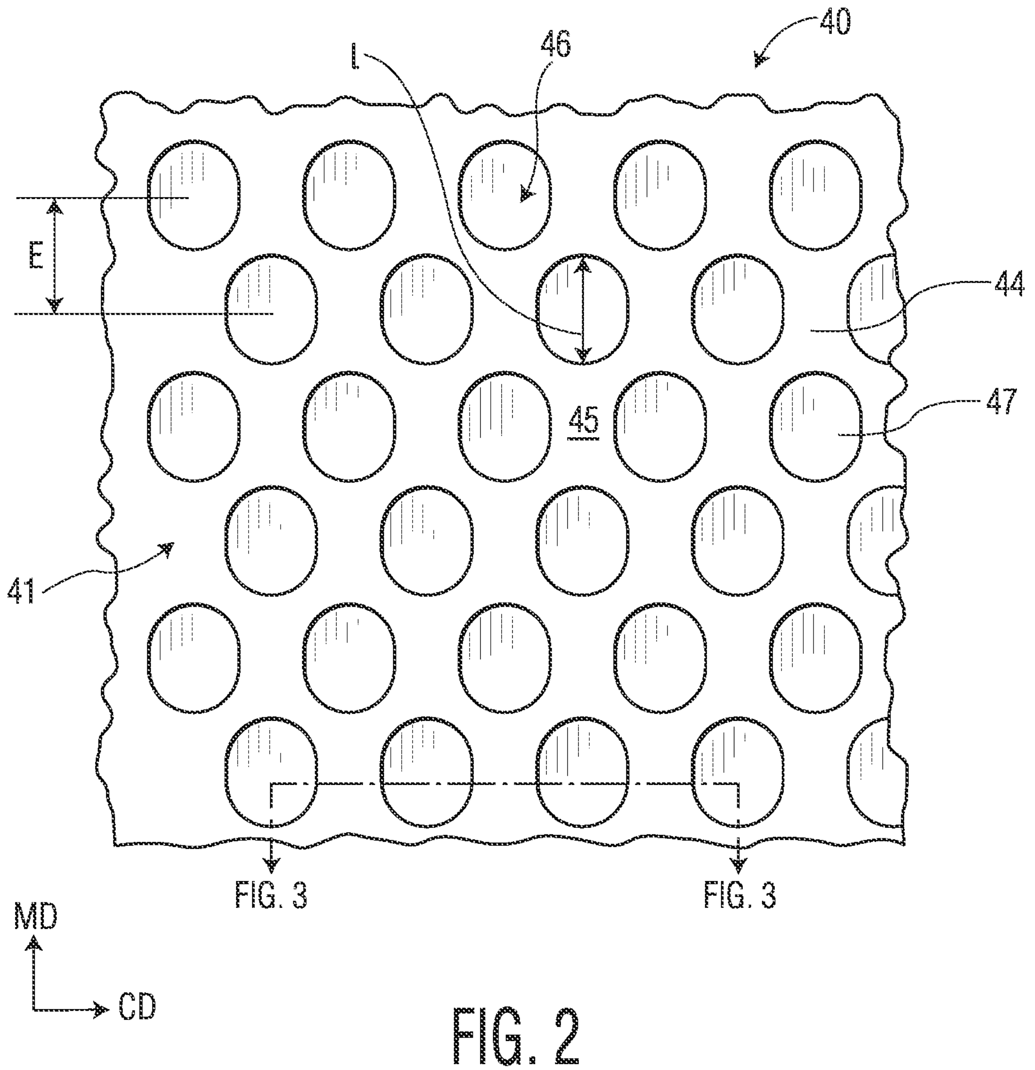
FIG. 2 is a top plan view of a structuring belt useful in producing the tissue products of the present invention.
Figure 3:
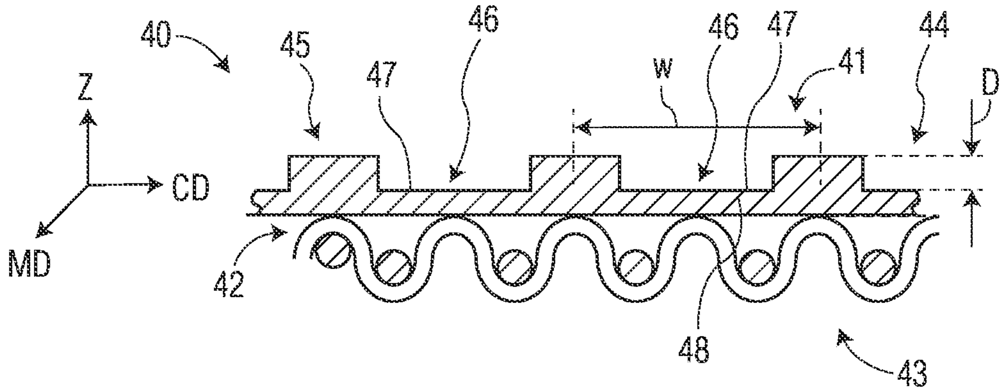
FIG. 3 is a cross-sectional view of a structuring belt taken through line FIG. 3-FIG. 3. of FIG. 2.

With reference now to FIGS. 2 and 3, preferred structuring belts will be discussed in more detail. The structuring belt 40 generally comprises at least two distinct layers 42, 44. The first layer 42, also referred to herein as the support structure, forms the bottom most surface 43 of the belt 40 and is generally the surface brought into contact with the papermaking equipment, such as rollers, during use. The second layer 44, also referred to herein as the web contacting layer, forms the web contacting surface 41 of the belt 40 and is the portion of the first layer surface contacted by the nascent tissue web in use. Together the first and second layers 42, 44 form the structuring belt 40 and provide it with an upper surface 41 and an opposite bottom surface 43. While the structuring belt 40 shown in FIG. 2 comprises two layers 42, 44, the invention is not so limited and in other embodiments the belt 40 may comprise more than two layers, such as three, four, five or six layers.

The support structure 42 is preferably a woven layer formed from one or more textile materials, such as woven yarns, yarn arrays, spiral links, knits, braids, or spiral wound strips. Textile materials useful in forming the support structure 42 may be any one of those well known in the art such as, for example, polymers, such as polyethylene terephthalate ("PET"), polyamide ("PA"), polyethylene ("PE"), polypropylene ("PP"), polyphenylene sulfide ("PPS"), polyether ether ketone ("PEEK"), or a combination thereof.

Weave patterns useful in forming the support structure 42 are well known in the art and will not be detailed here. In certain embodiments the support structure 42 may comprise a single layer of woven material, while in other embodiments it may comprise multiple layers of woven material. In those embodiments where the support structure 42 comprises multiple woven layers, the additional woven layers may be incorporated to enhance structure stability and serve as a sacrificial wear layer. Regardless of whether the support structure 42 comprises a single, or multiple layers, it may be woven in a pattern that is warp dominant, shute dominant, or coplanar. Further, regardless of whether the support structure 42 comprises one, or more than one, woven layers, it is generally preferred that the support structure 42 is permeable to air and water. In certain embodiments the support structure 42 may have an air permeability of at least about 200 cubic feet per minute (CFM).

The second layer 44, also referred to herein as the web contacting layer, preferably comprises a nonwoven material joined to the support structure 42 in a face-to-face relationship. According to an exemplary embodiment, the second layer 44 may comprise an extruded polymeric material formed separately from the support structure 42 and attached thereto in a laminating process to form the multi-layered structuring belt 40. In certain preferred embodiments the second layer 44 may be made from an extruded flexible thermoplastic material. Generally, there is no particular limitation on the types of thermoplastic materials suitable for forming second layer 44, as long as the material generally has the properties, such as compressibility, flex fatigue and crack resistance, and ability to temporarily adhere and release the web from its surface when required. In certain preferred embodiments, the material used to form the second layer 44 is a polyurethane.

The second layer 44 generally has an upper web contacting surface 41 and includes a plurality of depressions 46 for structuring and molding the nascent web. Preferably the depressions 46 do not form holes or apertures in the second layer 44 such that the second layer 44 remains substantially impermeable to air and water. The depressions 46, which may have a variety of shapes, geometries, extend in the Z-direction below the upper most surface 45 of the second layer 44 thereby providing the second layer 44 with at least two surface planes—an upper most surface plane defined by the upper most surface 45 of the land areas surrounding the depressions 46 and a bottom most surface plane defined by the bottom most surface 47 of the depression 46. As will be explained in more detail below, the depressions have a depth that facilitates molding of the nascent tissue web immediately prior to being pressed against the drying surface and further, are preferably disposed in a machine-direction oriented pattern that improves the properties of the resulting tissue products.

Generally, the belts, as well as the tissue products produced thereby, comprise a cross-machine direction oriented line element. The line elements may be formed from a plurality of discrete elements that give the visual appearance of being connected so as to form a visually connected line. Line elements may also be formed from a single element that extends in the cross-machine direction. The line element may be discrete or may be continuous. Further, the line element may be a straight or substantially straight line element. In other instances, the line element may be a curvilinear line element, such as a sinusoidal line element.

In one example, the line element and/or line element forming component is continuous or substantially continuous within the surface of the belt or tissue product, for example, the line elements extend continuously across the surface of a tissue product in the cross-machine direction for a first edge of the tissue product to a second, opposite, edge.

While in certain embodiments it may be preferable that a line element be continuous, the invention is not so limited and includes discrete line elements. Further, the belts and products may comprise a plurality of cross-machine direction oriented line elements spaced apart from one another in the machine direction. In one example, a tissue product may comprise a plurality of parallel line elements. The plurality of parallel line elements may be a series of parallel line elements. In one example, the plurality of parallel line elements may comprise a plurality of parallel curvilinear line elements, and more preferably parallel sinusoidal line elements.

With reference again to FIG. 2, the structuring belt 44 generally has an upper web contacting surface 41 and includes a plurality of depressions 46 for structuring and molding the nascent web. The depressions may take on any number of different shapes, such as discrete dots or line elements, and may have any number of different cross-sectional shapes. In the embodiment illustrated in FIG. 2, the depressions 46 are discrete with an oval shape. The depressions 46 have a long dimension (I) and short dimension (w). Further, depressions 46 may be spaced apart from one another both in the machine direction (MD) and the cross-machine direction (CD). The MD spacing (E) is generally measured from the center of one depression to the center of the next adjacent depression in the machine direction and the CD spacing (W) is generally measured from the center of one depression to the center of the next adjacent depression in the cross-machine direction. The spacing and arrangement of depressions relative to one another will be described in more detail below.

While the depressions 46 may have a number of different shapes and geometries, they preferably have a depth (D), measured between the upper most surface plane 45 and the bottom most surface 47 of the depression 46. Preferably the depth (D) ranges from about 0.10 to 0.90 mm, more preferably the depth (D) ranges from about 0.15 to about 0.70 mm, even more preferred the depth (D) ranges from about 0.20 to 0.50 mm. All of the depressions may have substantially similar depths, or the depths may be varied slightly amongst the depressions, yet the depth of each individual depression is within the foregoing ranges.

The spacing and arrangement of the depressions may vary depending on the desired tissue product properties and appearance. In one embodiment, such as that illustrated in FIGS. 4 and 5, the depressions 46 form line elements 50 that extend continuously throughout one dimension of first web contacting surface 41. Each depression 46 is discrete and spaced apart from one another, yet they are arranged such that they are visually connected to one another and form the line element 50, which is continuous. Thus, while the line element 50 is continuous, it is formed from discrete depressions 46. Without wishing to be bound by any particular theory, it is believed that the absence of truly continuous depressions, that is depressions that have not beginning or end within a dimension of the fabric surface, is advantageous and the use of discrete depressions exclusively to form the pattern is preferable. Continuous depressions have a tendency to collect water during the manufacturing process overly wetting the nascent web in the areas contacted thereby. These areas may become excessively wet and negatively affect creping. Thus, to avoid this detritus effect, the structuring belt may be provided with a pattern formed entirely of discrete depressions, which themselves may be arranged in a way that provides a pattern that is visually connected and has a continuous appearance.

Figure 4:
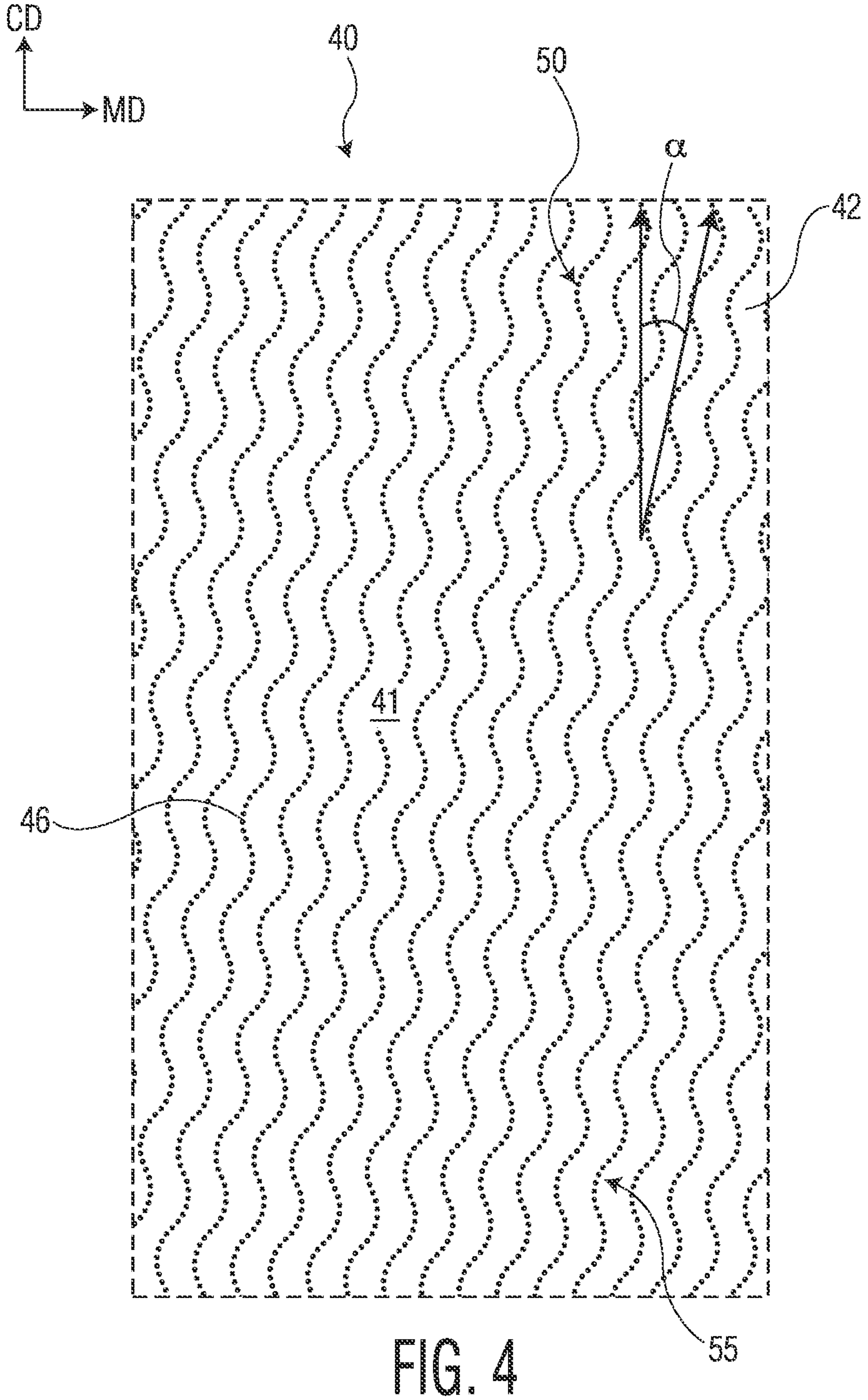
FIG. 4 is a top plan view of one example of a structuring belt useful in producing the tissue products of the present invention.
Figure 5:
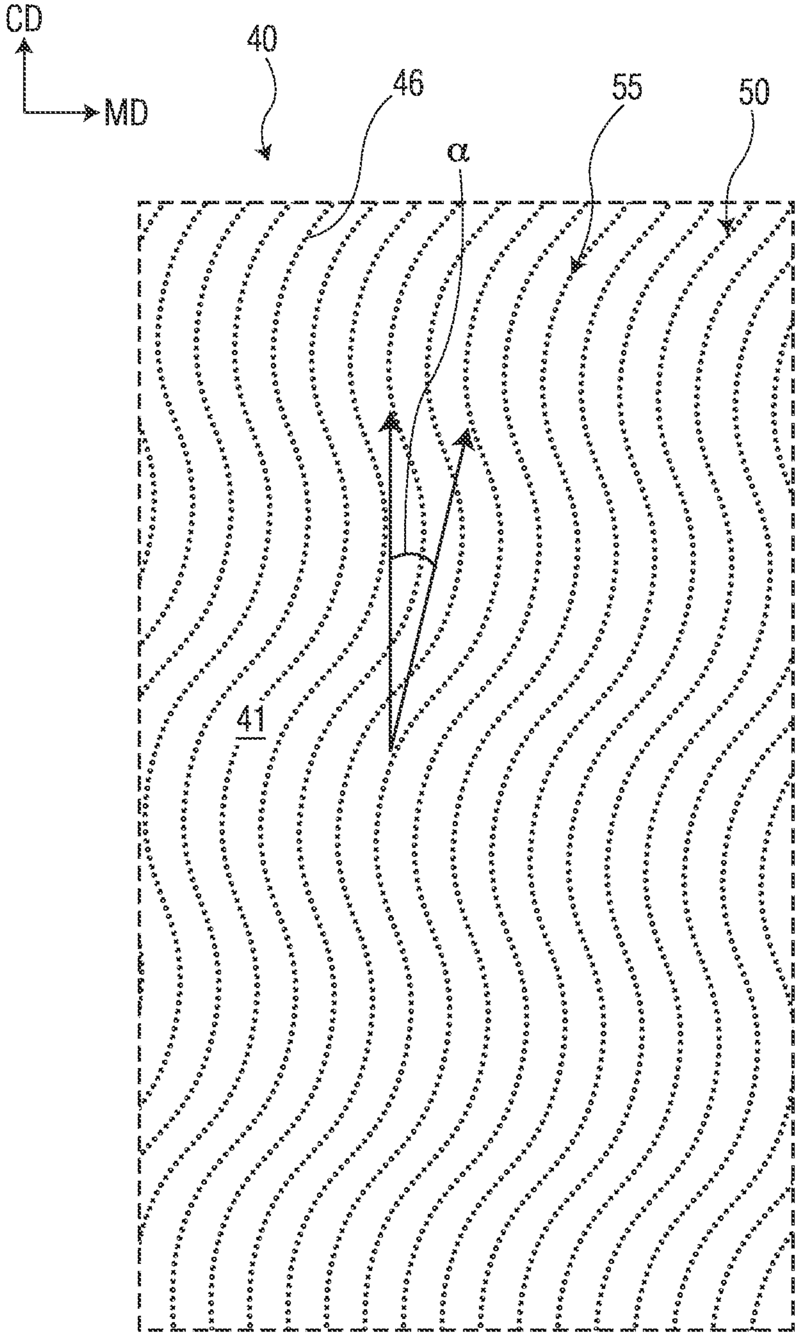
FIG. 5 is a top plan view of another example of a structuring belt useful in producing the tissue products of the present invention.

With continued reference to FIGS. 4 and 5, the line elements 50 are repeated to form a pattern 55. Thus, the line elements 50 may be spaced apart from one another in the machine direction (MD) of the fabric upper surface and may extend continuously across the fabric 40 in the cross-machine direction (CD) or may run at an angle (α) relative to the cross-machine direction (CD). Of course, line element alignment (machine direction, cross-machine direction, or diagonal) discussed above refer to the principal alignment of the elements. Within each alignment, the elements may have segments aligned at other directions, but aggregate to yield the particular alignment of the entire element.

Figure 6:
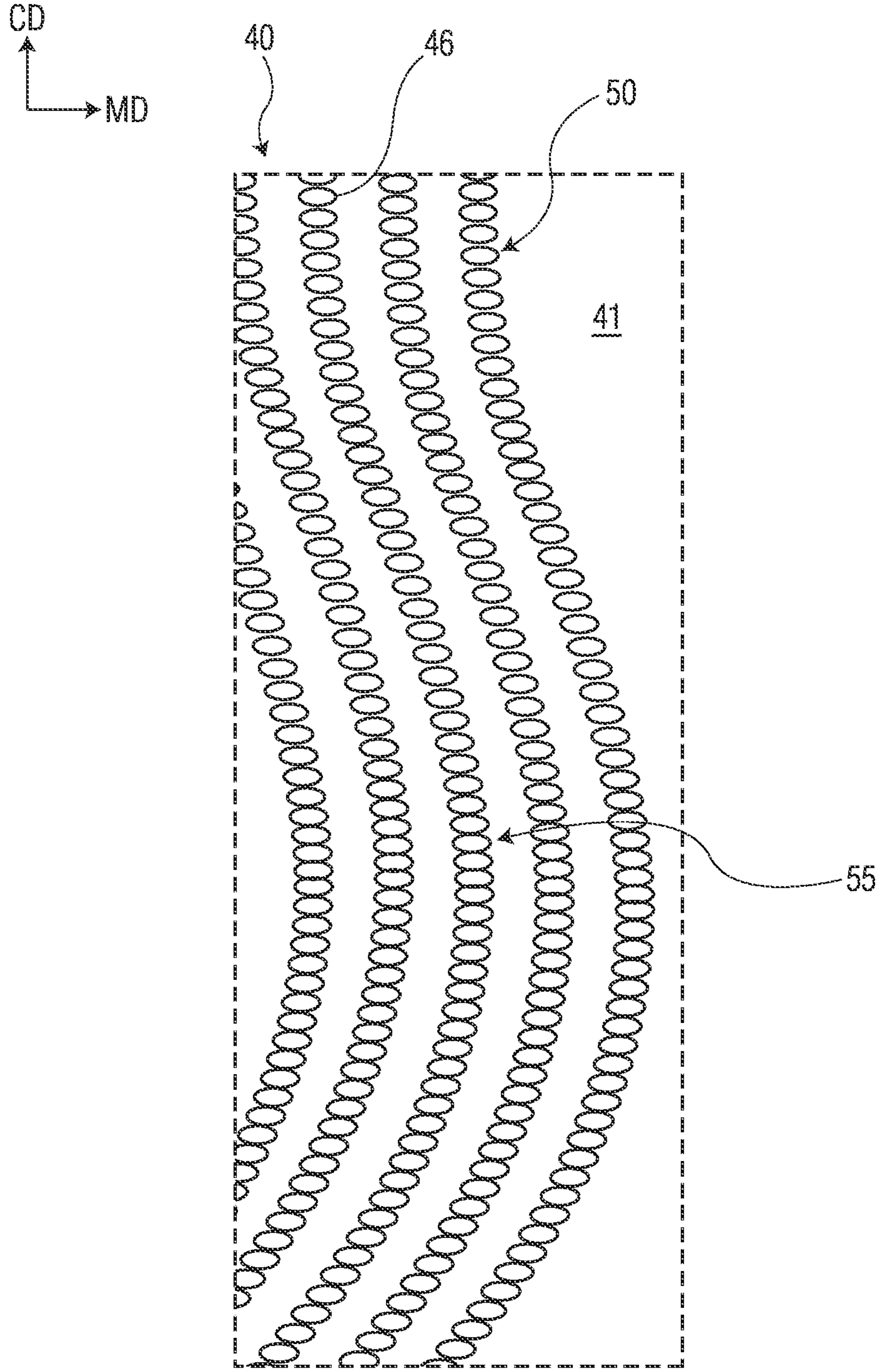
FIG. 6 is a top plan view of still another example of a structuring belt useful in producing the tissue products of the present invention.

The depressions 46, when viewed from the top plane, such as shown in FIGS. 4-6, can have various shapes, within a given pattern or between different patterns, including any shape of a two-dimensional closed figure, with non-limiting examples shown in FIGS. 4-6. For example, as shown in FIGS. 4 and 5, the depressions 46 may have a circular cross-sectional shape. The diameter of the depressions, if generally circular shaped, can be at least about 1.00 mm, such as at least about 1.10 mm, such as at least about 1.25 mm, such as from about 1.00 to about 2.50 mm, such as from about 1.10 to about 2.25 mm.

The center-to-center spacing (E) in the machine direction (MD) between discrete circular depressions 46 may range from about 0.20 to about 1.50 mm, such as from about 0.25 to about 1.00 mm. In certain preferred embodiments, particularly where the depressions are arranged to form a continuous line element, within a given line element the center-to-center spacing (E) in the machine direction (MD) between discrete circular depressions may be substantially uniform throughout the given line element and range from about 0.25 to about 1.00 mm.

In other embodiments, such as illustrated in FIG. 6, the depressions 46 may have an oval or elliptical shape with a discrete depression having a long dimension (I), for example being at least about 1.00 mm, such as from about 1.00 to about 2.50 mm, such as from about 1.10 to about 2.25 mm, and a short dimension (w) of at least about 0.75 mm, such as from about 0.75 to about 2.00 mm, such as from about 0.75 to about 1.25 mm.

In still other embodiments the depressions may vary in shape and/or size. For example, a structuring belt may comprise a first web contacting surface having two different shaped depressions—depressions having a circular cross-section and depressions having an oval cross-section—disposed thereon for interacting with and structuring the nascent tissue web. In a particularly preferred embodiment, despite having different shapes, the depressions are regularly spaced apart from one another to form a line element.

Other unique characteristics of structuring belts useful in the present invention include the percentage of contact area provided by the web contacting surface of the fabric. The percentage of contact area of the fabric refers to total surface area of the fabric's web contacting surface less the area of the depressions. The percentage of contact layer is related to the fact that relatively small discrete depressions can be formed in the inventive structuring belts versus in woven structuring belts or extruded polymeric monolithic fabrics. That is, depressions, in effect, reduce the contact area of the fabric, and as the multilayer fabric can have relatively small discrete depressions, the percentage of contact area may be reduced only slightly by the presence of the depressions. In some embodiments, the structuring belts useful in the present invention comprise a plurality of fine, discrete depressions and have a contact area of about 70 percent or greater, such as about 75 percent or greater, such as about 80 percent or greater, such as from about 70 to 90 percent, such as from about 75 to 90 percent.

With continued reference to FIGS. 4-6, the depressions 46 may be arranged to form line elements 50 that may be further arranged to form a pattern 55. In certain preferred embodiments, such as those illustrated in FIGS. 4-6 the patterns 55 comprise continuous line elements 50 extending substantially in the cross-machine direction (CD) with individual line elements 50 arranged generally parallel to, and equally spaced apart from, one another.

Generally, when referring to a line element as being substantially cross-machine direction oriented, the line element and/or series of line elements, has a principle longitudinal axis that is at an angle of less than 20 degrees, such as less than 15 degrees, such as less than about 12 degrees, such as from 0 to 20 degrees, with respect to the cross-machine direction axis of the product or belt on which it is disposed.

In one example, the line element and/or series of line elements having a principle longitudinal axis that is from about 1 to about 15 degrees, such as from about 2 to about 12 degrees, with respect to the machine direction axis of the product or belt on which it is disposed.

The line elements may take any number of shapes. In certain embodiments the line elements have a sinusoidal or wave-like shape. Particularly preferred, such as illustrated in FIGS. 4-6, are wave-shaped line elements 50 that extend continuously across the fabric in the CD and equally spaced apart from one another in the MD to provide a pattern 55.

In those instances where the line elements have a wave-shape, the elements preferably have a wavelength of at least about 10 mm, such as from about 10 to about 100 mm, such as from about 15 to about 75 mm, such as from about 15 to about 50 mm. In certain instances, the wave-shaped line elements may have an amplitude of at least about 1.0 mm, more preferably at least about 1.5 mm, such as from about 1.0 to about 10.0 mm, such as from about 1.0 to about 8.0 mm, such as from about 1.5 to about 5.0 mm.

Figure 7:
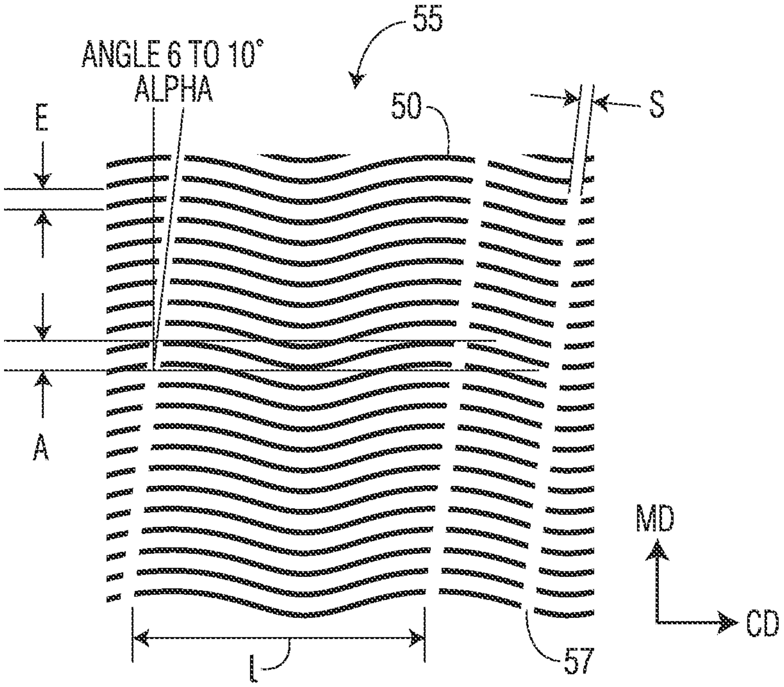
FIG. 7 is a top plan view of yet another example of a structuring belt useful in producing the tissue products of the present invention.
Figure 8B:
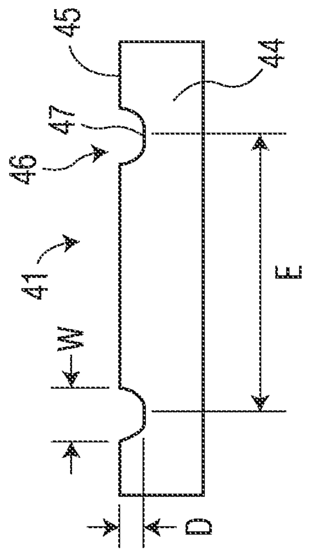
FIGS. 8A and 8B are top plan and cross-sectional views of a structuring belt useful in producing the tissue products of the present invention.
Figure 8A:
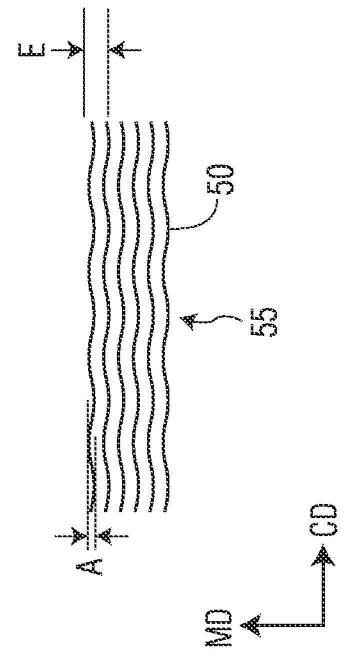

While the line elements 50 illustrated in FIGS. 4-6 are formed from discrete dots arranged to form a visually connected line, the invention is not so limited. In other embodiments, such as those illustrated in FIGS. 7 and 8A, the line elements may be formed from a single depression substantially oriented in the cross-machine direction. The depressions may be discrete, such as illustrated in FIG. 7, or they may extend continuously across the belt in the cross-machine direction, such as illustrated in FIG. 8A. Regardless of whether the depressions are discrete or continuous, it is generally preferred that they be arranged in a pattern that extends across the belt in the cross-machine direction.

With reference to FIG. 7, the line elements 50 may be discrete wave-shape lines arranged in a pattern 55. The line elements 50 are substantially oriented in the cross-machine direction (CD) and equally spaced apart from one another in the machine direction a distance (E) of about 5.0 mm. Further, in the illustrated embodiment, individual line elements 50 are formed from a single continuous depression having a width (W) of about 1.0 mm. There are breaks 57 separating the discrete line elements 55 such that they are spaced apart from one another a distance S. Within the pattern 55 the breaks 57 may be arranged at an angle from about 6 to about 10 degrees, relative to the machine direction axis. As further shown in FIG. 7, each of the discrete line elements 50 has a curvilinear shape and the MD length dimension of the line elements (I) varies within the pattern 55, yet the spacing (S) is uniform.

In certain instances, the dimensions and arrangement of depressions on a structuring belt of the present invention, and therefore the resulting tissue products made using the structuring belt, may be varied to achieve the desired aesthetic appearance, ease of manufacturing, and product physical properties. For example, taking the structuring belt of FIGS. 8A and 8B as a non-limiting example, the line elements 50 may be formed as a single continuous depression 46 within the nonwoven layer 44. The depression 46 may have a bottom surface 47 that provides the depression with a depth (D), which in the illustrated embodiment is about 0.35 mm, below the belt upper surface 45. Further, the line elements 50 have a wave-like shape with an amplitude (A) of about 3.0 mm and a wavelength of about 50 mm. The line elements 50 may also have a width (W) of about 0.8 mm and be equally spaced apart from one another in the machine direction a distance (E) of about 5.0 mm. The foregoing are only illustrative, and the line elements and patterns may take any number of shapes and sizes to form belts useful in the present invention, as outlined in Table 1, below.

TABLE 1

| Line Element Shape | Line Width (mm) | Line Depth (mm) | MD Spacing (mm) | Wave-length (mm) | Ampli-tude (mm) | Offset Angle α (°) | Con-tact Area (%) |
|---|---|---|---|---|---|---|---|
| Wave | 0.3-1.0 | 0.2-0.5 | 2.0-8.0 | 15-75 | 1.0-8.0 | 0-15 | 75-90 |

The foregoing structuring belts are useful in forming the inventive wet pressed tissue products of the present invention, which may be single-ply or multi-ply tissue products, provided in either rolled or stacked formats. In certain non-limiting embodiments, products of the present invention may be a multi-ply tissue product having a plurality of cross-machine direction oriented line elements formed by the structuring belt on which the tissue product is made. The cross-machine direction oriented line elements may extend continuously across the product in the cross-machine direction from a first product edge to a second product edge or may be discrete. Regardless, the product generally comprises a plurality of cross-machine oriented line elements and the line elements are spaced apart from one another in the machine direction. In certain instances, the line elements are parallel to one another and equally spaced apart in the machine direction.

Figure 9:
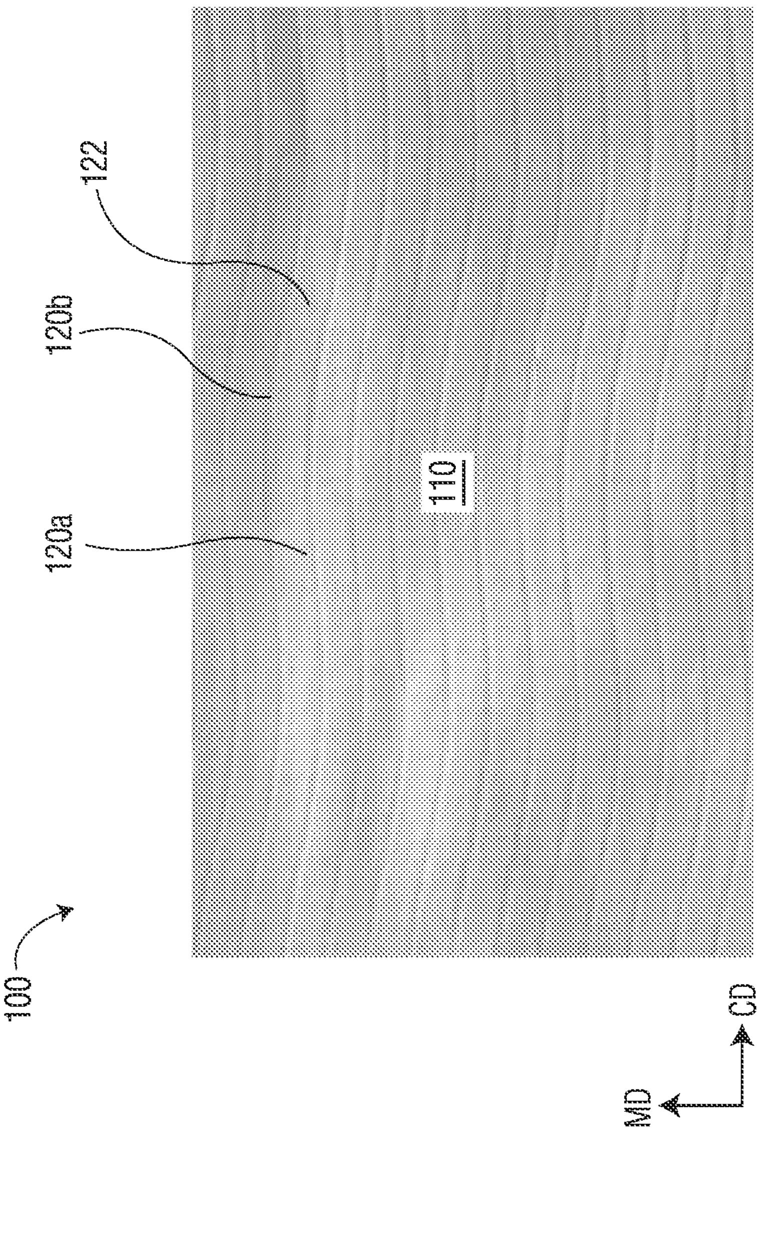
FIG. 9 is a top plan view of a tissue product according to one embodiment of the present invention.
Figure 10:
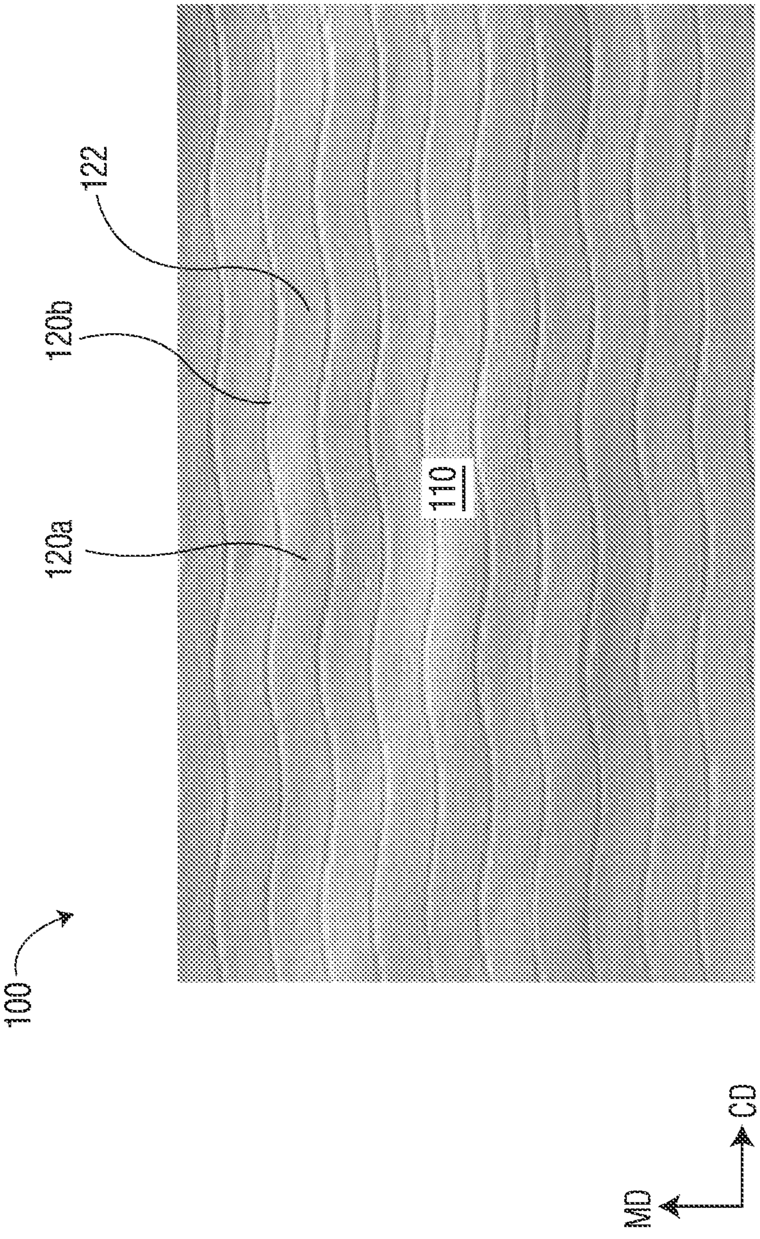
FIG. 10 is a top plan view of a tissue product according to another embodiment of the present invention.

Non-limiting examples of tissue products 100 produced according to the present invention are illustrated in FIGS. 9 and 10. As shown in FIGS. 9 and 10, the tissue products 100 have a first outer surface 110 with a plurality of line elements 120*a*, 120*b* disposed thereon. The line elements 120*a*, 120*b* are formed as depressions and are separated from one another by a land area 122 having an upper surface that defines the upper most surface plane of the first outer surface 110. The line elements 120*a*, 120*b* have a sinusoidal wave shape and are oriented in the cross-machine direction (CD) and spaced apart from one in the machine direction (MD). The line elements 120*a*, 120*b* extend continuously across the first outer surface 110.

The tissue products of the present invention are preferably manufactured by a wet pressed tissue making process such as, for example, Advanced Tissue Molding System (ATMOS), New Tissue Technology (NTT), Quality Rush Transfer (QRT) or Energy Efficient Technologically Advanced Drying (ETAD) using a structured fabric as described above.

Preferably the products are manufactured by molding the nascent tissue web to the structuring belt such that the pattern disposed on the fabric is imparted to the web and can be seen by the consumer in the finished product. Preferably the molding step occurs immediately prior to creping such that the molded, nascent, web is transferred from the structuring belt to a cylindrical dryer and then subsequently removed by creping.

The dried and creped tissue web can be further processed by any number of well-known converting operations such as calendering, plying, embossing, slitting, winding, folding, or applying a surface treatment such as a lotion. In certain embodiments, for example, after the web is creped, it may be passed through a calender, plied with other creped tissue webs, embossed, and wound up prior to further converting operations.

The tissue products of the present invention may comprise a surface treatment agent, such as a lotion, or be void of a surface treatment agent. In one example, the tissue product is a non-lotioned tissue product having at least one structured ply with a pattern disposed thereon. In yet another example, the tissue product may comprise one or more non-lotioned creped wet pressed tissue plies.

The tissue products of the present invention may comprise a temporary wet strength agent and/or may be void of a permanent wet strength agent.

The tissue products of the present invention can be single-ply or multi-ply products and generally comprise cellulosic pulp fibers. Other naturally-occurring and/or non-naturally occurring fibers can also be present in forming the tissue products. In one example, the tissue products of the present invention may comprise one or more tissue plies where the tissue plies comprise natural wood pulp fibers and are creped wet pressed tissue plies having a pattern disposed thereon where the pattern is imparted by the structuring belt.

The tissue products of the invention have been generally described in the context of bath tissue however the invention is not so limited, and the processes described herein may be adapted to the manufacture of other tissue products, particularly folded facial tissue products.

In an effort to improve the product performance properties of, for example, current creped bath tissue, the inventors designed a new pattern for the distribution of discrete elements, particularly discrete molded elements, that provides for relatively higher substrate volume that holds up under pressure. It is believed that the increased substrate volume under pressure contributes to improved bulk and better cleaning when used to wipe skin surfaces. Further, the new pattern provides the product with an aesthetically pleasing appearance without negatively affecting manufacture of the product or resulting product performance. Specifically, the arrangement of discrete elements to form continuous line elements, particularly sinusoidal line elements that extend in the cross-machine direction, albeit with a slight offset angle in certain embodiments, improves the bulk of rolled products through anti-nesting. Further, the spacing of the discrete elements, particularly the spacing of elements in the machine-direction, improves pattern clarity while further enhancing bulk. Finally, width and depth of the discrete elements, particularly relative to the basis weight of the tissue, provides sufficient volume for the fibers to adequately conform without rupturing when the nascent web is molded by the structuring belt. This improves the manufacture of the products, while also maintaining important product properties such as tensile and stretch.

In connection with the present invention, tissue webs and products may be made by dispersing papermaking fibers into an aqueous furnish (slurry) and depositing the aqueous furnish onto the forming wire of a papermaking machine. Any suitable forming scheme might be used. For example, an extensive but non-exhaustive list in addition to Fourdrinier formers includes a crescent former, a C-wrap twin wire former, an S-wrap twin wire former, or a suction breast roll former. The forming fabric can be any suitable foraminous member including single layer fabrics, double layer fabrics, triple layer fabrics, photopolymer fabrics, and the like.

The aqueous furnish may contain chemical additives to alter the physical properties of the resulting tissue web or product. These chemistries are well understood by the skilled artisan and may be used in any known combination. Such additives may be surface modifiers, softeners, debonders, strength aids, latexes, opacifiers, optical brighteners, dyes, pigments, sizing agents, barrier chemicals, retention aids, insolubilizers, organic or inorganic crosslinkers, or combinations thereof; said chemicals optionally comprising polyols, starches, PPG esters, PEG esters, phospholipids, surfactants, polyamines, HMCP (Hydrophobically Modified Cationic Polymers), HMAP (Hydrophobically Modified Anionic Polymers), or the like.

The furnish can be mixed with strength adjusting agents such as wet strength agents, dry strength agents, and debonders/softeners, and so forth. Suitable wet strength agents are known to the skilled artisan. A comprehensive, but non-exhaustive, list of useful strength aids include urea-formaldehyde resins, melamine formaldehyde resins, glyoxylated polyacrylamide resins, polyamide-epichlorohydrin resins, and the like. Of particular utility are the polyamide-epichlorohydrin wet strength resins, an example of which is sold under the Kymene™ brand (commercially available from Solenis, Wilmington, DE). An extensive description of polymeric-epihalohydrin resins is given in Chapter 2: Alkaline-Curing Polymeric Amine-Epichlorohydrin by Espy in Wet Strength Resins and Their Application (L. Chan, Editor, 1994), herein incorporated by reference in its entirety in a manner consistent with the present invention.

Suitable temporary wet strength agents include materials that can react with hydroxyl groups, such as on cellulosic pulp fibers, to form hemiacetal bonds that are reversible in the presence of excess water. Suitable temporary wet strength agents are known to those of ordinary skill in the art. Non-limiting examples of temporary wet strength agents suitable for the fibrous structures of the present invention include glyoxalated polyacrylamide polymers, for example cationic glyoxalated polyacrylamide polymers. Temporary wet strength agents useful in the present invention may have average molecular weights of from about 20,000 to about 400,000, such as from about 50,000 to about 400,000, such as from about 70,000 to about 400,000, such as from about 70,000 to about 300,000, such as about 100,000 to about 200,000. In certain instances, the temporary wet strength agent may comprise a commercially available temporary wet strength agent such as those marketed under the tradename Hercobond™ (Solenis, Wilmington, DE) or Fenno-Bond™ (Kemira Chemicals, Inc., Atlanta, GA).

Suitable dry strength agents include carboxymethyl cellulose resins, starch based resins, and mixtures thereof. Particularly preferred dry strength additives are cationic starches, and mixtures of cationic and anionic starches. In certain instances, the dry strength agent may comprise a commercially available modified starch such as marketed under the tradename RediBOND™ (Ingredion, Westchester, IL) or a commercially available carboxymethyl cellulose resin such as those marketed under the tradename Aqualon™ (Ashland LLC, Bridgewater, NJ).

The amount of wet strength agent or dry strength added to the pulp fibers can be at least about 0.1 dry weight percent, more specifically about 0.2 dry weight percent or greater, and still more specifically from about 0.1 to about 3.0 dry weight percent, based on the dry weight of the fibers.

In certain embodiments the furnish may be mixed with one or more debonding agents. In certain preferred embodiments one or more layers of a multi-layered tissue web, such as the middle layer, may be formed without a substantial amount of inner fiber-to-fiber bond strength by selectively treating the furnish forming the layer with a debonding agent. The debonding agent can be added to the fiber slurry during the pulping process or can be added directly the fiber slurry prior to the headbox.

Suitable debonding agents that may be used in the present invention include cationic debonding agents, particularly quaternary ammonium compounds, mixtures of quaternary ammonium compounds with polyhydroxy compounds, and modified polysiloxanes. Other suitable debonding agents are disclosed in U.S. Pat. No. 5,529,665, the contents of which are incorporated herein in a manner consistent with the present disclosure. In one embodiment, the debonding agent used in the process of the present invention is an organic quaternary ammonium chloride, such as those available under the tradename ProSoft™ (Solenis, Wilmington, DE). The debonding agent can be added to the fiber slurry in an amount of from about 1.0 kg per metric tonne to about 15.0 kg per metric tonne of fibers present within the slurry.

Particularly useful quaternary ammonium debonders include imidazoline quaternary ammonium debonders, such as oleyl-imidazoline quaternaries, dialkyl dimethyl quaternary debonders, ester quaternary debonders, diamidoamine quaternary debonders, and the like. The imidazoline-based debonding agent can be added in an amount of between 1.0 to about 10.0 kg per metric tonne.

After formation, the nascent web may be compactively dewatered on a papermaking felt. Any suitable felt may be used. For example, felts can have double-layer base weaves, triple-layer base weaves, or laminated base weaves. Preferred felts are those having the laminated base weave design.

The compactively dewatered web may be transferred to a structuring belt, such as disclosed above, and transported to a cylindrical dryer, such as Yankee dryer, to dry the web. Typically, the compactively dewatered web is transferred from the structuring belt to the cylindrical dryer via a press element. The press element can be a through drilled (bored) pressure roll, a through drilled (bored) and blind drilled (blind bored) pressure roll, or a shoe press. After the web leaves this press element and before it contacts the cylinder, the consistency of the web may range from about 40 to about 50 percent. The web is then dried by the heated cylinder and, optionally, a hot air impingement hood installed over the cylinder. The dried web is removed from the cylinder by doctoring using a creping blade. Generally, only a portion of the web is contacted by the creping blade, thus, the dominant surface topography is generated by the structuring belt, with the creping process having a much smaller effect.

The surface of the cylindrical dryer may be treated with a chemical adhesive, a creping composition, to aid in transfer and retention of the web as is well-known in the art. The creping composition most preferably consists essentially of a polyvinyl alcohol resin and a polyamide-epichlorohydrin resin wherein the weight ratio of polyvinyl alcohol resin to polyamide-epichlorohydrin resin is from about 2 to about 4.

The tissue products of the present invention may exhibit a basis weight from about 10 to about 45 gsm, such as from about 12 to about 42 gsm, such as from about 14 to about 40 gsm. The tissue products may have a basis weight greater than about 20 gsm, such as greater than about 30 gsm, such as greater than about 40 gsm, such as from about 20 to about 80 gsm, such as from about 30 to about 60 gsm, such as from about 45 to about 55 gsm. In a particularly preferred embodiment, the product comprises two creped, wet-pressed tissue plies and the product has a basis weight from about 30 to about 60 gsm.

At the foregoing basis weights, the products of the products of the present invention may have a sheet bulk greater than about 8.0 cc/g, more preferably greater than about 9.0 cc/g, and still more preferably greater than about 10.0 cc/g, such as from about 8.0 to about 12.0 cc/g. In a particularly preferred embodiment, the product comprises two creped, wet-pressed tissue plies and the product has a basis weight from about 30 to about 60 gsm and a sheet bulk from about 10.0 to about 12.0 cc/g. The foregoing sheet bulks are generally improved compared to conventionally manufactured creped wet, pressed tissue products.

The products of the present invention generally have good strength and softness, without being excessively stiff. For example, the products may have a geometric mean tensile (GMT) of about 700 g/3" or greater, such as about 800 g/3" or greater, such as about 900 g/3" or greater, such as from about 700 to about 1,700 g/3", such as from about 800 to about 1,600 g/3", such as from about 900 to about 1,500 g/3". At the foregoing tensile strengths, the geometric mean slope (GM Slope) may be less than about 18.0 kg, more preferably less than about 16.0 kg and still more preferably less than about 14.0 kg, such as from about 12.0 to about 18.0 kg. As such, the products may have a Stiffness Index of about 15.0 or less, such as about 12.0 or less, such as about 10.0 or less, such as from about 6.0 to about 15.0, such as from about 6.0 to about 12.0.

In a particularly preferred embodiment, the present invention provides a two ply creped, wet pressed tissue product comprising two plies spirally wound around a core, the product having a GMT from about 900 to about 1,500 g/3" and a TS7 value of about 13.0 or less, more preferably 12.0 or less, such as from about 10.0 to about 13.0.

In still other embodiments the invention provides tissue products having sheet properties that are particularly amenable to forming rolled tissue products having improved roll structure. Thus, the products have good basis weight and improved sheet bulk and can be converted into rolled products having good firmness, such as a roll firmness of less than about 7 mm, such as less than about 6.5 mm. In one particular embodiment, for instance, a roll firmness of about 5.5 or less, such as about 5.0 or less, such as from about 4.0 to about 5.5. Within the above-roll firmness ranges, rolls made according to the present disclosure do not appear to be overly soft and "mushy" as may be undesirable by some consumers during some applications.

Test Methods

Tissue Softness Analyzer

Softness and surface smoothness were measured using an EMTEC Tissue Softness Analyzer ("TSA") (Emtec Electronic GmbH, Leipzig, Germany). The TSA comprises a rotor with vertical blades which rotate on the tissue sample applying a defined contact pressure. The blades are pressed against the sample with a load of 100 mN and the rotational speed of the blades is two revolutions per second. Contact between the vertical blades and the tissue sample creates vibrations, which are sensed by a vibration sensor. The sensor transmits a signal to a PC for processing and display. The signal is displayed as a frequency spectrum. The frequency spectrum is analyzed by the associated TSA software to determine the amplitude of the frequency peak occurring in the range between 200 to 1000 Hz. This peak is generally referred to as the TS750 value (having units of dB V2 rms) and represents the surface smoothness of the tissue sample. A high amplitude peak correlates to a rougher surface, while a low amplitude peak correlates to a smoother surface. A further peak in the frequency range between 6 and 7 kHZ represents the softness of the sample. The peak in the frequency range between 6 and 7 kHZ is herein referred to as the TS7 value (having units of dB V2 rms). The lower the amplitude of the peak occurring between 6 and 7 kHZ, the softer the sample.

Tissue product samples were prepared by cutting a circular sample having a diameter of 112.8 mm. All samples were allowed to equilibrate at TAPPI conditions for at least 24 hours prior to completing the TSA testing. After conditioning each sample was tested as is, i.e., multi-ply products were tested without separating the sample into individual plies. The sample is secured, and the measurements are started via the PC. The PC records, processes, and stores all of the data according to standard TSA protocol. The reported TS750 and TS7 values are the average of five replicates, each one with a new sample.

Basis Weight

Prior to testing, all samples are conditioned under TAPPI conditions (23±1° C. and 50±2 percent relative humidity) for a minimum of 4 hours. Basis weight of sample is measured by selecting twelve (12) products (also referred to as sheets) of the sample and making two (2) stacks of six (6) sheets. In the event the sample consists of perforated sheets of bath or towel tissue, the perforations must be aligned on the same side when stacking the usable units. A precision cutter is used to cut each stack into exactly 10.16×10.16 cm (4.0×4.0 inch) squares. The two stacks of cut squares are combined to make a basis weight pad of twelve (12) squares thick. The basis weight pad is then weighed on a top loading balance with a minimum resolution of 0.01 grams. The top loading balance must be protected from air drafts and other disturbances using a draft shield, Weights are recorded when the readings on the top loading balance, become constant. The mass of the sample (grams) per unit area (square meters) is calculated and reported as the basis weight, having units of grams per square meter (gsm).

Caliper

Caliper is measured in accordance with TAPPI test methods Test Method T 580 μm-12 "Thickness (caliper) of towel, tissue, napkin and facial products." The micrometer used for carrying out caliper measurements is an Emveco 200-A Tissue Caliper Tester (Emveco, Inc., Newberg, OR). The micrometer has a load of 2 kilopascals, a pressure foot area of 2,500 square millimeters, a pressure foot diameter of 56.42 millimeters, a dwell time of 3 seconds and a lowering rate of 0.8 millimeters per second.

Tensile

Tensile testing is conducted on a tensile testing machine maintaining a constant rate of elongation and the width of each specimen tested is 3 inches. Testing is conducted under TAPPI conditions. Prior to testing samples are conditioned under TAPPI conditions (23±1° C. and 50±2 percent relative humidity) for at least 4 hours and then cutting a 3±0.05 inches (76.2±1.3 mm) wide strip in either the machine direction (MD) or cross-machine direction (CD) orientation using a JDC Precision Sample Cutter (Thwing-Albert Instrument Company, Philadelphia, PA, Model No. JDC 3-10, Serial No. 37333) or equivalent. The instrument used for measuring tensile strengths was an MTS Systems Sintech 11S, Serial No. 6233. The data acquisition software was MTS TestWorks® for Windows Ver. 3.10 (MTS Systems Corp., Research Triangle Park, NC). The load cell was selected from either a 50 Newton or 100 Newton maximum, depending on the strength of the sample being tested, such that the majority of peak load values fall between 10 to 90 percent of the load cell's full-scale value. The gauge length between jaws was 4±0.04 inches (101.6±1 mm) for facial tissue and towels and 2±0.02 inches (50.8±0.5 mm) for bath tissue. The crosshead speed was 10±0.4 inches/min (254±1 mm/min), and the break sensitivity was set at 65 percent. The sample was placed in the jaws of the instrument, centered both vertically and horizontally. The test was then started and ended when the specimen broke. The peak load was recorded as either the "MD tensile strength" or the "CD tensile strength" of the specimen depending on direction of the sample being tested. Ten representative specimens were tested for each product or sheet and the arithmetic average of all individual specimen tests was recorded as the appropriate MD or CD tensile strength having units of grams per three inches (g/3"). Tensile energy absorbed (TEA) and slope are also calculated by the tensile tester. TEA is reported in units of g·cm/cm$^2$ and slope is recorded in units of kilograms (kg). Both TEA and Slope are directionally dependent and thus MD and CD directions are measured independently.

Wet tensile strength measurements are measured in the same manner as described above, but the previously conditioned sample strip is saturated with distilled water immediately prior to loading the specimen into the tensile test equipment. Preferably, prior to performing a wet tensile test, the sample is aged to ensure the wet strength resin has cured. Artificial aging may be used for samples that were to be tested immediately after or within days of manufacture. For artificially aging, sample strips are heated for 4 minutes at 105±2° C. For natural aging, the samples are held at 22±2° C. and 50 percent relative humidity for a period of 12 days prior to testing.

Following aging the samples are wetted individually and tested. Sample wetting is performed by first laying a single test strip onto a piece of blotter paper (Fiber Mark, Reliance Basis 120). A pad is then used to wet the sample strip prior to testing. The pad is a green, Scotch-Brite brand (3M) general purpose commercial scrubbing pad. To prepare the pad for testing, a full-size pad is cut approximately 2.5 inches long by 4 inches wide. A piece of masking tape is wrapped around one of the 4-inch long edges. The taped side then becomes the "top" edge of the wetting pad. To wet a tensile strip, the tester holds the top edge of the pad and dips the bottom edge in approximately 0.25 inches of distilled water located in a wetting pan. After the end of the pad has been saturated with water, the pad is then taken from the wetting pan and the excess water is removed from the pad by lightly tapping the wet edge three times across a wire mesh screen. The wet edge of the pad is then gently placed across the sample, parallel to the width of the sample, in the approximate center of the sample strip. The pad is held in place for approximately one second and then removed and placed back into the wetting pan. The wet sample is then immediately inserted into the tensile grips, so the wetted area is approximately centered between the upper and lower grips. The test strip should be centered both horizontally and vertically between the grips. (It should be noted that if any of the wetted portion comes into contact with the grip faces, the specimen must be discarded, and the jaws dried off before resuming testing.) The tensile test is then performed, and the peak load recorded as the wet tensile strength of this specimen. As with the dry tensile test, MD and CD directions are measured independently and ten representative specimens were tested for each product or sheet and the arithmetic average of all individual specimen tests was recorded as the appropriate MD or CD tensile strength.

All products were tested in their product forms without separating into individual plies.

Roll Firmness

Roll Firmness was measured using the Kershaw Test as described in detail in U.S. Pat. No. 6,077,590, which is incorporated herein by reference in a manner consistent with the present disclosure. The apparatus is available from Kershaw Instrumentation, Inc. (Swedesboro, NJ) and is known as a Model RDT-2002 Roll Density Tester.

We claim:

1. A creped, wet pressed tissue product having a first and a second surface, the first surface comprising a plurality of molded, substantially continuous cross-machine direction (CD) oriented, line elements having a wave-like shape, the product having a basis weight from about 30 to about 60 grams per square meter (gsm), a sheet bulk of about 8.0 cc/g or greater and a Stiffness Index of about 15.0 or less.

2. The creped, wet pressed tissue product of claim 1 wherein the line elements extend continuously in the cross-machine direction (CD) from a first edge of the tissue product to a second edge of the tissue product and wherein the line elements are arranged parallel to one another.

3. The creped, wet pressed tissue product of claim 2 wherein the parallel line elements are equally spaced apart from one another in the machine direction (MD) and the MD spacing ranges from about 2.0 to about 10.0 mm.

4. The creped, wet pressed tissue product of claim 1 wherein the line elements are oriented at an angle relative to the cross-machine direction (CD) axis and the angle of orientation ranges from 1 to 10 degrees.

5. The creped, wet pressed tissue product of claim 1 wherein the line elements are formed from a plurality of discrete molded elements having a circular, elliptical, or oval cross-sectional shape and wherein each of the discrete molded elements within a given line element are equally spaced apart from one another.

6. The creped, wet pressed tissue product of claim 5 wherein the discrete molded elements have a circular cross-sectional shape and a diameter (D) from about 1.0 to about 2.0 mm.

7. The creped, wet pressed tissue product of claim 5 wherein the discrete molded elements have an elliptical cross-sectional shape with a maximum length dimension from about 1.0 to about 2.5 mm.

8. The creped, wet pressed tissue product of claim 1 wherein the line elements have a sinusoidal shape and a wavelength from about 15 to about 75 mm.

9. The creped, wet pressed tissue product of claim 8 wherein the sinusoidal shaped line elements have an amplitude from about 1.0 to about 8.0 mm.

10. The creped, wet pressed tissue product of claim 1 wherein the plurality of molded, substantially cross-machine direction (CD) oriented, line elements comprise less than about 20 percent of the area of the first surface.

11. The creped, wet pressed tissue product of claim 1 wherein the plurality of molded, substantially cross-machine direction (CD) oriented, line elements consist of discrete curvilinear depressions having bottom surfaces lying below the uppermost surface plane of the first surface.

12. The creped, wet pressed tissue product of claim 1 wherein the first surface further comprises a plurality of embossments.

13. The creped, wet pressed tissue product of claim 1 having a basis weight from about 35 to about 45 gsm and a geometric mean tensile (GMT) from about 900 to about 1,500 g/3".

14. The creped, wet pressed tissue product of claim 1 having a geometric mean slope less than about 15.0 kg.

15. A creped, wet pressed tissue product having a first and a second surface, the first surface comprising a plurality of substantially continuous cross-machine direction (CD) oriented molded sinusoidal wave shaped line elements, the plurality of line elements arranged parallel to one another and equally spaced apart from one another in the machine direction (MD) to form a pattern, the product having a basis weight from about 30 to about 60 grams per square meter (gsm), a sheet bulk of about 8.0 cc/g or greater and a Stiffness Index of about 15.0 or less.

16. The creped, wet pressed tissue product of claim 15 wherein the line elements are formed from a plurality of discrete molded elements having a circular, elliptical, or oval cross-sectional shape and wherein each of the discrete molded elements are equally spaced apart from one another.

17. The creped, wet pressed tissue product of claim 15 wherein the line elements are formed from a plurality of discrete molded line elements, each of the discrete molded line elements having a cross-machine direction length and machine direction width and each of the discrete molded line elements being spaced apart from one another in both the machine and cross-machine directions.

18. A method of forming a tissue product comprising depositing a dilute fiber furnish onto a forming fabric of a papermaking machine so as to form a wet tissue web, at least partially dewatering the wet tissue web in a press section of the papermaking machine while supported by a structuring belt comprising a first and a second layer and a plurality of depressions disposed thereon, wherein at the first or the second layer is impermeable to air and water, the depressions arranged to form line elements that are substantially continuous oriented in the cross-machine direction (CD), pressing the partially dewatered tissue web onto a cylindrical dyer to dry the tissue web and creping the dried tissue web from the surface of the cylindrical dryer, wherein the dried tissue web comprises a molded, substantially CD oriented line element corresponding to the structuring belt depression.

19. The method of claim 18 wherein the molded, substantially CD oriented line element has a sinusoidal shape with a wavelength from about 15 to about 75 mm and an amplitude from about 1.0 to about 8.0 mm.

20. The method of claim 18 further comprising the steps of embossing the dried tissue web to yield an embossed tissue web and plying two embossed tissue plies together to produce a multi-ply tissue product having a basis weight from about 30 to about 60 grams per square meter (gsm), a sheet bulk of about 8.0 cc/g or greater and a Stiffness Index of about 15.0 or less.

* * * * *